June 2, 1953     C. W. ZIMMERMAN     2,640,869

TEMPERATURE COMPENSATED SUSCEPTIBILITY LOGGING SYSTEM

Filed June 3, 1950     2 Sheets—Sheet 1

CARL W. ZIMMERMAN
INVENTOR.

BY D. Carl Richards
AGENT

June 2, 1953 — C. W. ZIMMERMAN — 2,640,869
TEMPERATURE COMPENSATED SUSCEPTIBILITY LOGGING SYSTEM
Filed June 3, 1950 — 2 Sheets-Sheet 2

CARL W. ZIMMERMAN
INVENTOR.

BY D. Carl Richards
AGENT

Patented June 2, 1953

2,640,869

UNITED STATES PATENT OFFICE 2,640,869

TEMPERATURE COMPENSATED SUSCEPTIBILITY LOGGING SYSTEM

Carl W. Zimmerman, Dallas, Tex., assignor, by mesne assignments, to Schlumberger Well Surveying Corporation, Houston, Tex., a corporation of Delaware Application June 3, 1950, Serial No. 165,972

5 Claims. (Cl. 175—182)

This invention relates to geophysical exploration and more particularly to a temperature stabilized system for electromagnetically exploring formations penetrated by a bore hole.

In well logging systems such as disclosed in copending application Serial No. 72,451, now Patent Number 2,535,666, for an Electrical Logging System by Robert A. Broding, a co-worker of applicant, an elongated solenoid electromagnetically coupled to formations is utilized as one element of a system for detecting variations in the magnetic and resistive properties along the length of a bore hole. In lowering such a sensitive system through the various earth strata, temperature gradients are encountered. Since the system includes electrical elements sensitive to temperature changes, logs obtained often are not truly representative of the formation but rather are associated in a primary way with bore hole temperature variations and the effect thereof on the components of the logging system.

It is an object of the present invention to provide a system for eliminating errors in logging data due to temperature variations.

It is a further object of the invention to provide a temperature compensated elongated exploring solenoid for electromagnetically exploring earth formations.

A further object of the invention is to provide a bridge network system having one arm sensitive to variations in formation characteristics temperature stabilized by an adjacent arm and the remaining elements of the bridge wholly insensitive to such changes and independent of or unaffected by temperature variations.

In accordance with the present invention and in one form thereof, a magnetic logging system which includes an elongated solenoid having a magnetically permeable core and forming one arm of a bridge circuit is provided with means for eliminating the effect of variations in the magnetic reluctance of the core of the solenoid as a function of temperature. For example, any change of the magnetic reluctance of the solenoid core caused by temperature variations produces a corresponding change in the self-inductance of the solenoid which in turn affects the condition of balance of the bridge. Preferably, such undesired inductance variations are compensated for by causing a temperature sensitive resistor to follow the same temperature variations as the core of said elongated solenoid. The solenoid itself forms one arm of a bridge network. The temperature sensitive resistor is included in an adjacent arm of the bridge whereby variations in temperature produce an equal and opposite effect in said adjacent arms whereby the bridge output is independent of temperature and depends only upon variations in the formations.

For further objects and advantages of the present invention and for a more complete understanding thereof, reference may now be had to the following description taken in conjunction with the accompanying drawings in which.

Figures 1, 2:
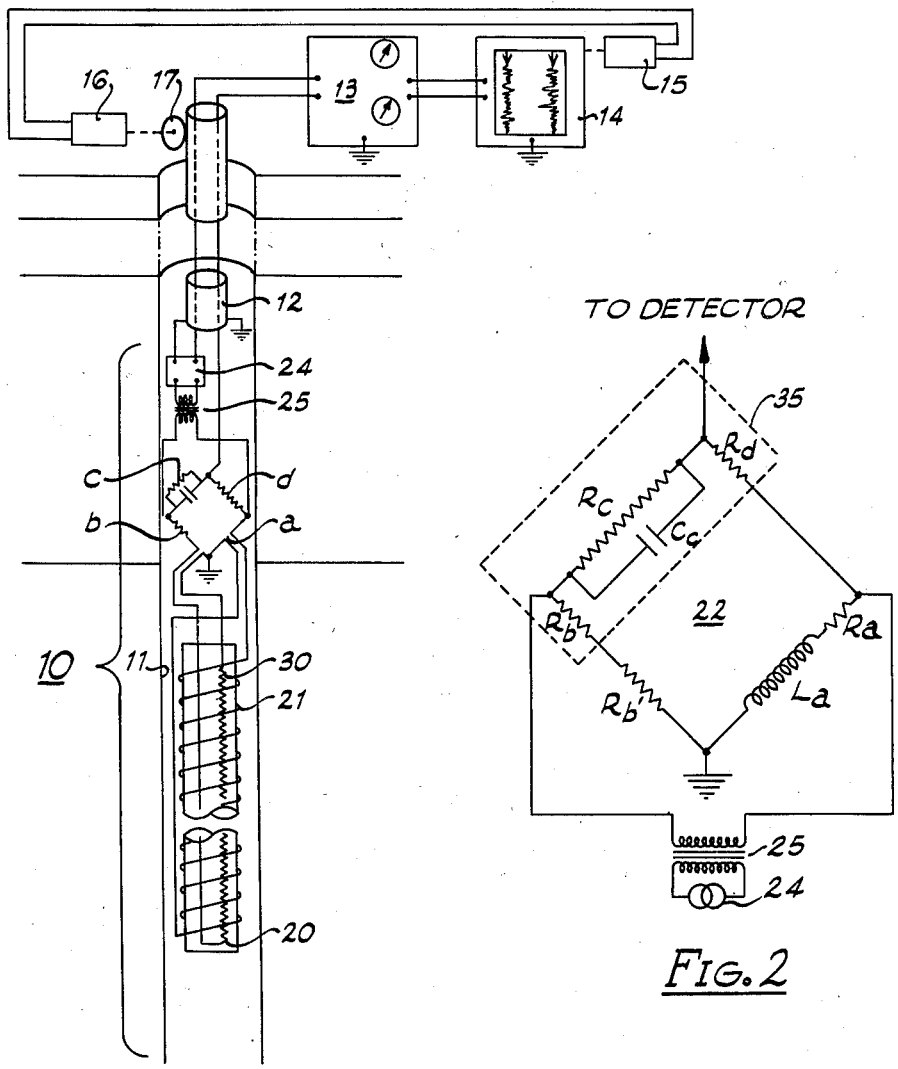
Fig. 1 is a diagrammatic view of a logging system embodying the present invention.
Fig. 2 is a circuit diagram of the bridge network of Fig. 1.

Referring now to Fig. 1, there is illustrated a logging system in which the exploring elements 10 are lowered into a bore hole 11 by a cable 12 which is terminated electrically in a detecting instrument 13. The output of the detecting instrument 13 may be measured by suitable meters or may be recorded on a strip chart 14. The strip chart recorder is driven through a system comprised of a Selsyn receiver 15 energized via circuit 15a from a Selsyn transmitter 16 which generates a voltage proportional to the travel of the cable 12 past a sheave or pulley 17. Signals or voltages generated or produced by the exploring unit 10 are thus measured and recorded at the surface or at the top of the bore hole 11 as a function of depth. Variations in the signal recorded or measured are then utilized to aid in the determination of the character of the formations penetrated by the bore hole.

In the system illustrated, an elongated magnetic solenoid core 20 having a conductor 21 spiraled or wrapped therearound forms a part of the exploring unit. The winding 21 of the solenoid 20 is terminated in a bridge network 22 and forms one arm thereof. The bridge network may be characterized as a Maxwell L-C bridge in which an inductance to be measured is included in an arm opposite an arm having a resistance shunted by a condenser. It will be understood that the inductance of the winding 21 is a function of the number of turns therein and of the magnetic properties of the core 20. In Fig. 1 the solenoid 20 electromagnetically coupled to adjacent formations is included in arm $a$ of the bridge 22, whereas the resistance-capacitance combination forms arm $c$. The arms $b$ and $d$ of substantially pure resistance complete the bridge. A voltage from an alternating current source 24 is applied through transformer 25 to the diagonal of the bridge 22 common to the ends of arms $a$ and $b$. The bridge output is detected at the vertical diagonal, the juncture of the arms $a$ and $b$ being grounded, and the juncture of arms $c$ and $d$ connected by a suitable conductor in cable 12 to the detecting circuit 13. Thus a signal proportional to bridge unbalance is transmitted to the surface.

In electrical bore hole logging with such a system, it has been found that variations in the temperature as the solenoid 20 passes from one depth to another or from one formation to another produces output signals from the bridge 22 which are not directly related to the character of the formations desired to be studied. The resistance of conductor 21 ordinarily will vary as a function of temperature. Similarly the permeability of the core material may be affected by temperature variations. Either or both of the above effects produce undesired electrical impedance variations and, consequently, output signals in the bridge network.

In order to eliminate extraneous and unwanted variations in the core itself, applicant provides a means for temperature compensating the arm $a$ of bridge 22 and for rendering insensitive to temperature the rest of the bridge network. As diagrammatically illustrated in Fig. 1, an elongated resistance element 30 is embedded within the solenoid 20 and extends, preferably, substantially the full length thereof. Thus, both the solenoid 20 and resistance element 30 are subject to the same temperature variations. Since the core of solenoid 20 is massive, having considerable thermal inertia, the disposition of resistance 30 within the core itself will make the temperature of the resistance 30 follow temperature variations exactly as does the core of the solenoid while in the bore hole.

The resistance element 30 forms a part of the arm $b$ of bridge 22. As will be shown later, a change in resistance of arm $b$ produces an unbalance opposite in effect to that produced by thermally induced variations in inductance and resistance of arm $a$. With such a compensating resistor properly included in the exploring unit 10, signals detected at the surface unit 13 will be dependent only upon the desired properties of formations themselves and independent of bore hole temperature.

Referring now to Fig. 2, a schematic diagram of the bridge network 22 is illustrated wherein the winding $L_a$ represents the inductance of the solenoid 20 and $R_a$ represents the resistance of the winding. The resistance elements $R_b$ and $R_{b'}$ connected in series constitute the arm $b$ of bridge 22. The elements $R_c$ and $C_c$, and $R_d$ make up the remaining arms $c$ and $d$ respectively. It can readily be shown that the inductance $L_a$ may be expressed as follows:

$$L_a = R_d C_c (R_b + R_{b'}) \quad (1)$$

Similarly, the resistance $R_a$ may be described by the following equation:

$$R_a = \frac{R_d}{R_c}(R_b + R_{b'}) \quad (2)$$

(See Principles of Electricity by Page and Adams, D. Van Nostrand Company, Inc., published June 1941 (page 481, Equations 120-2).) It will be recognized that the bridge network 22 constitutes a so-called "product arm" bridge inasmuch as the resistances in the adjacent arms enter as a product in the equation of balance for determining the inductance. From Equation 1 it will be apparent that variations in the inductance $L_a$ may be compensated by corresponding variations in either $R_d$, $C_c$, or $R_b$. Variations in $R_a$ similarly may be compensated by variation of $R_d$, $R_c$, or $R_b$. In accordance with the present invention, at least a portion of the resistance of arm $b$, i. e., $R_{b'}$, forms the elongated resistance 30 of Fig. 1. The ratio of $R_b$ to $R_{b'}$ may be selected so that for a given material forming resistance 30 or $R_{b'}$ the effect in the bridge network of an increase in the impedance of the arm $b$ as a function of temperature will be precisely equal and opposite to the effect of an increase in the impedance of the arm $a$ for the same function of temperature.

Figure 3:
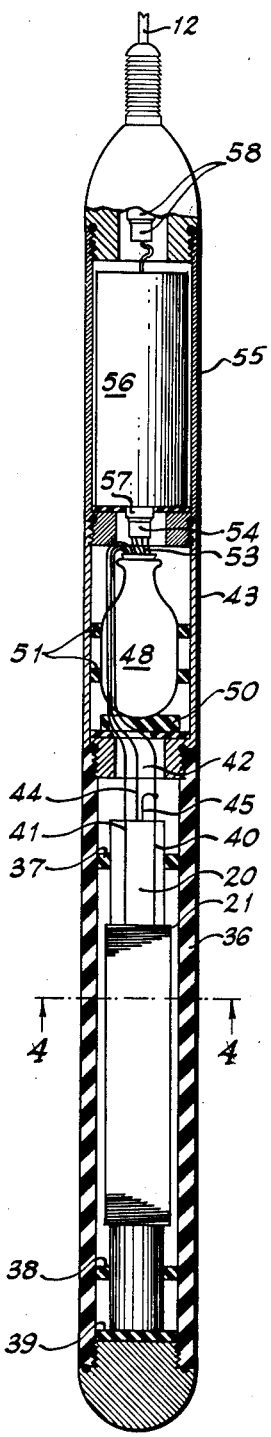
Fig. 3 is a sectional view of a logging instrument.

Further, and in accordance with the present invention, means are provided for thermally shielding or insulating the remaining portion of the bridge and more particularly that portion enclosed within the dotted outline 35 of Fig. 2 so that only the solenoid 20 and the resistance 30 will be subject to temperature effects. While other means might be used, it has been found convenient to place the elements $R_b$, $R_c$, $C_c$ and $R_d$ in a vacuum cell or evacuated housing whereby variations in temperature as far as those elements are concerned will be negligible. Such a system has been illustrated in more detail in Fig. 3. In this system the solenoid 20 with the windings 21 is housed in or carried by a non-magnetic tube 36 of insulating material. Rubber rings 37 and 38 encircle the core of the solenoid 20 at points beyond winding or coil 21 to serve as absorbers for lateral shocks. A washer or disc 39 cushions the lower end of the core. Thus mounted, generation of noise upon stress of the laminations of the core 20 is prevented.

Figure 4:
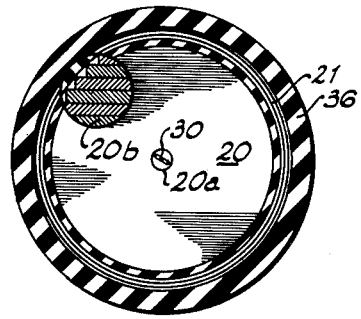
Fig. 4 is a cross sectional view of the solenoid taken along the line 4—4 of Fig. 3.
Figure 5:
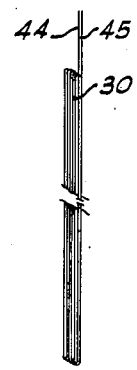
Fig. 5 is an isometric view of a part of the temperature compensating resistor.

The core preferably is comprised of a plurality of laminations of high quality magnetic material illustrated in the magnified section $20b$ of Fig. 4. The compensating resistance 30 is disposed in a central aperture $20a$ extending through the core 20. The resistance itself (illustrated in Fig. 5) comprises a plurality of loops of wire folded to form an elongated bifilar resistance element. The resistor 30 illustrated in the enlarged view of Fig. 5 preferably extends substantially completely along the length of the laminations of the solenoid 20. The resistor 30 may be firmly mounted in the aperture $20a$ by embedding it in a wax having relatively high melting point. Thus mounted, the resistance will follow closely the variation in temperature of the core 20, taking advantage of the thermal inertia of the massive core to average out small variations in bore hole temperature greatly to reduce the range over which compensation is required.

Leads 40 and 41 extend from the windings 21 through an opening 42 in a housing 43 of stainless steel or other non-magnetic material which threadedly engages the upper end of the non-magnetic tube 36. Further, a lead 44 of the compensating resistance 30 extends up through the opening 42 while the second lead 45 is connected to the lead 40, forming one apex of the bridge network.

An enclosure 48 which may be of the type ordinarily used as a thermos bottle is disposed within the housing 43 and is "shock mounted" by the rubber disc 50 and rings 51. The elements enclosed within the dotted outline of Fig. 2 are placed in the bottle 48 and immersed in a bath of oil or other corrosion resistant liquid such as a silicone. The container 48 is then sealed with wax so that the enclosed elements will be substantially unaffected by and insulated from temperature variations.

Four conductors 53 leading to and from the bridge network are terminated in a plug 54. An amplifier housing 55 threadedly engages the upper end of the stainless steel housing 43 and encloses an amplifier 56 having a plug receptacle 57 at the lower end thereof to couple to the plug 54. Circuits leading from the surface to the amplifier 56 similarly are completed through a plug and receptacle combination 58 at the upper end of the amplifier 56.

Constructed in accordance with the foregoing, the exploring system having a temperature-sensitive solenoid as an element of the exploring bridge network is temperature compensated by providing the resistance element in intimate heat exchange relation with the solenoid and thus exposed to attenuated bore hole temperature variations. If the solenoid is constructed utilizing core material whose magnetic permeability increases with temperature, the compensating resistance must be made from resistance wire having a positive temperature coefficient. It will be recognized that the losses in a solenoid that are affected by temperature will include the loss in the core itself and the loss in the copper windings thereof. If the net loss in the core and winding decreases with increasing temperature in the bore hole, it may be necessary to insert a temperature compensating resistance in series with arm $a$ of the bridge. However, it is ordinarily possible to make the copper losses in the solenoid approximately equal to the core losses over a limited temperature range. The core losses decrease with increasing temperature whereas the copper losses in the winding for positive temperature coefficient windings increase with increasing temperature. When such is the case, the compensating resistance $R_{b'}$ of Fig. 2 compensates for any change in the permeability of the core of the solenoid as the temperature of its surroundings is changed. In any case and for each solenoid, the size of the compensating resistance element and its characteristics depend altogether upon the characteristic of the solenoid to be compensated. Suitable values of resistance may be empirically determined by those skilled in the art. The procedure for making such determination in several instances was to place the solenoid in a liquid bath of controlled variable temperature. The unbalance of the bridge as a function of temperature was then plotted. Thereafter, selected compensating resistances were inserted in the bridge network in the arm adjacent the solenoid and were placed with the solenoid in the variable temperature bath. A second set of measurements of bridge unbalance as a function of temperature was then plotted. Three tests of such empirical nature were generally found to be adequate in arriving at a satisfactory value of resistance for compensating the bridge network over the range of temperatures required.

As an example of an embodiment of the present invention and not by way of limitation, a solenoid constructed in the following manner has been found to be temperature compensated. The core 20 was made up of laminations of high grade magnetic material .005 inch thick. It was 21 inches long and approximately 2 inches in diameter. The aperture 20$a$ was $\frac{3}{16}$ of an inch in diameter and extended longitudinally at the center of the core 20. The winding 21 consisted of approximately 700 turns of No. 20 enameled copper wire and extended for 12 inches longitudinally symmetrically of the core. The inductance of the core was 66.5 millihenrys and had an alternating current resistance of 8.2 ohms at 1,000 cycles per second with a D. C. resistance of 3.77 ohms. The compensating resistor had a resistance of 68.2 ohms at 20° C. and was made up of a plurality of loops of No. 38 enameled copper wire of substantially the same length as the core material and was mounted in the $\frac{3}{16}$ inch hole 20$a$ in the core.

The exploring solenoid constructed as above described was utilized in a system, the remaining elements of which had the following specifications: the resistance $R_b$ (forming together with the compensating resistance $R_{b'}$, the arm $b$ of the bridge 22 of Fig. 1) was 377.2 ohms, $R_d$ was 500 ohms, $R_c$ was 32,500 ohms and $C_c$ was .3 microfarad. The bridge was operated at a frequency of 1,000 cycles and was found to be substantially free of drift, producing zero change in output signal as a function of temperature over ranges encountered.

While a particular embodiment of the invention has been shown, it will be understood that modifications will now suggest themselves to those skilled in the art. It is therefore intended to cover such modifications of the invention as fall within the scope of the appended claims.

What is claimed is:

1. In a well logging system including a product arm bridge network having a plurality of arms connected to form two conjugate diagonals and of a type in which the value of an inductance in one arm can be expressed as a function of the value of a resistance in another arm under conditions of balance across one conjugate diagonal of said bridge network when alternating current is applied across the other conjugate diagonal, an inductor connected in said one arm of the bridge and adapted to be moved through the well, said inductor having an inductance value adapted to vary as a function of the ambient temperature, the improvement which comprises a temperature responsive resistance element disposed to be subjected to temperature variations corresponding to the temperature variations experienced by said inductor as the latter is moved through the well, said resistance element being designed so that its resistance value will vary with temperature, over a temperature range, in accordance with the corresponding variations with temperature in the inductance of said inductor, said variations in inductance being expressed in terms of the equivalent variations in resistance in said another arm, and circuit means connecting said resistance element in said another arm of the bridge, whereby said bridge network will be maintained in balance for variations in the inductance of said inductor with temperature over said temperature range.

2. In a well logging system including a product arm bridge network having a plurality of arms connected to form two conjugate diagonals and of a type in which the value of an inductance in one arm can be expressed as a function of the value of a resistance in another arm under conditions of balance across one conjugate diagonal of said bridge network when alternating current is applied across the other conjugate diagonal, an elongated solenoid connected in said one arm of the bridge and adapted to be moved through the well, said solenoid having a core the magnetic reluctance of which varies as a function of the ambient temperature, the improvement which comprises a temperature responsive resistance element embedded in the core of said solenoid so as to be at substantially the same temperature as said core, said resistance element being designed so that its resistance value will vary with temperature, over a temperature range, in accordance with the corresponding variations with temperature in the inductance of said solenoid, said inductance being expressed in terms of the equivalent variations in resistance in said another arm, and circuit means connecting said resistance element in said another arm of the bridge, whereby said bridge network will be maintained in balance for variations in the inductance of said solenoid with temperature over said temperature range.

3. A well logging system as defined in claim 2 in which all of the bridge network is adapted to be lowered into the well and thermal insulating means is provided for housing all of said bridge network except said solenoid and said resistance element.

4. A well logging system as defined in claim 2 in which the core for the solenoid is provided with an aperture extending longitudinally through the axis thereof and the temperature responsive resistance element is an elongated bifilar resistance embedded in said aperture.

5. A well logging system as defined in claim 2 in which the solenoid and the core therefor are so constructed and arranged that variations in copper losses in the solenoid with temperature are equal in magnitude and opposite in sense to variations in core losses with temperature.

CARL W. ZIMMERMAN.

References Cited in the file of this patent

UNITED STATES PATENTS

| Number | Name | Date |
|---|---|---|
| 1,089,030 | Angel | Mar. 3, 1914 |
| 1,379,266 | Keeler | May 24, 1921 |
| 1,479,087 | Rice | Jan. 1, 1924 |
| 1,601,383 | Todd | Sept. 28, 1926 |
| 2,083,387 | Merrill | June 8, 1937 |
| 2,274,013 | Swenson | Feb. 24, 1942 |
| 2,370,609 | Wilson | Feb. 27, 1945 |
| 2,377,496 | Williams | June 5, 1945 |
| 2,535,666 | Broding | Dec. 26, 1950 |